United States Patent Office 3,452,416
Patented July 1, 1969

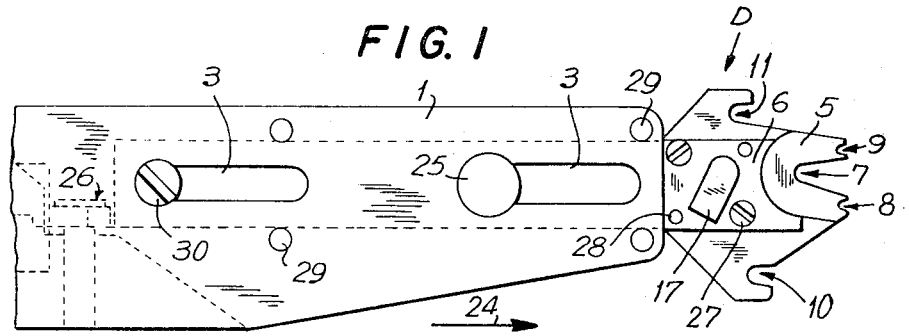
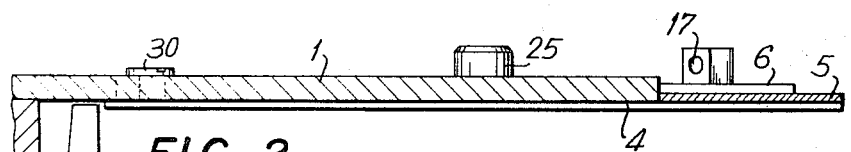
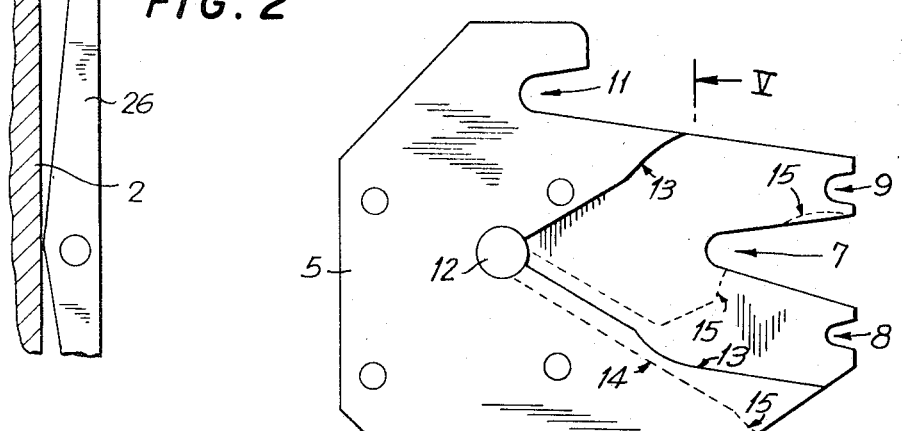
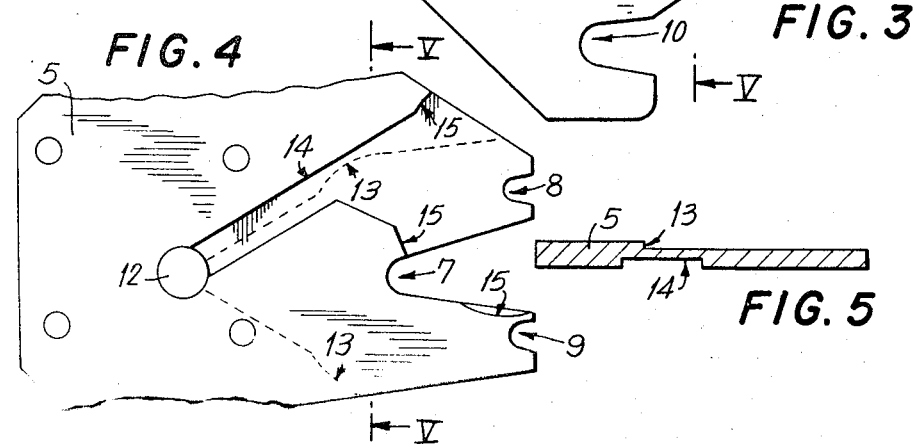

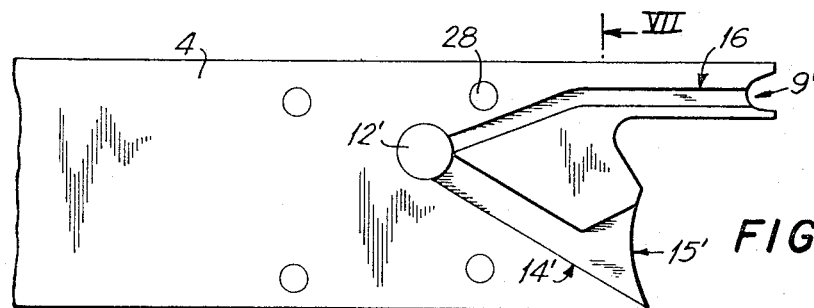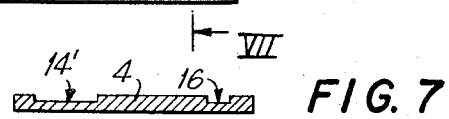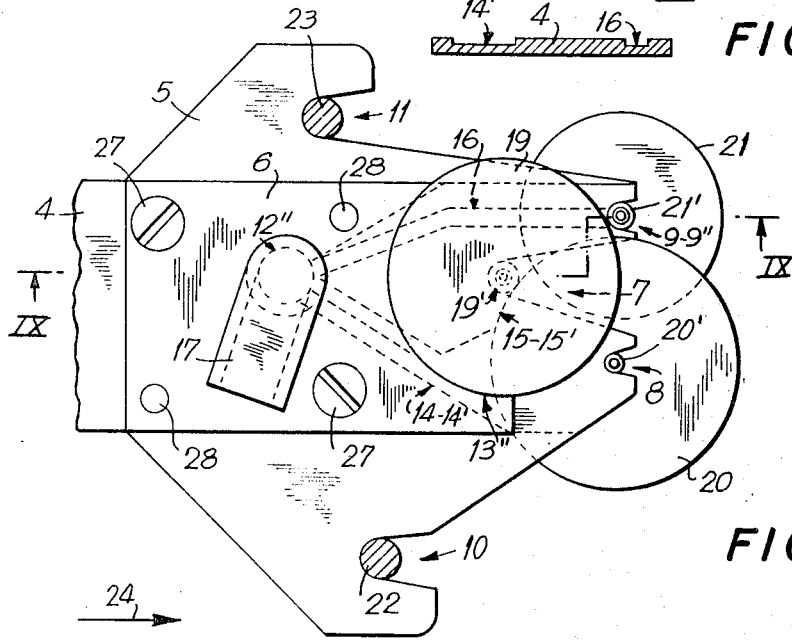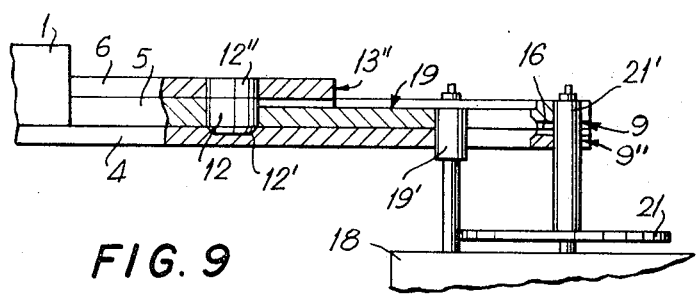

3,452,416
DEVICE FOR HOLDING PIVOTAL RUNNERS IN POSITION TO ENABLE CONNECTION OF THE RUNNERS BY A BRIDGE
Claude Berney, Le Sentier, and Claude Meylan, Le Brassus, Switzerland, assignors to S.A. de la Fabrique de Horlogerie Le Coultre et Cie, Le Sentier, Switzerland
Filed Feb. 11, 1966, Ser. No. 526,795
Claims priority, application Switzerland, Sept. 22, 1965, 13,179/65
Int. Cl. B23p *19/00;* B25b *11/00*
U.S. Cl. 29—200         8 Claims

ABSTRACT OF THE DISCLOSURE

A device for holding pivotal runners in position to enable connection of their pivots by a bridge, wherein the device comprises a flat member having notches which are disposed to receive shafts or pinions of the pivotal runners in a fixed predetermined position and to serve as a positioning template therefor. The flat member is composed of a plurality of superposed plates having grooves which are adapted for being placed into communication with a source of vacuum to produce an effect on the runners to hold the same in position during installation in their bearings.

---

The present invention relates to a device for holding pivotal runners in a fixed predetermined position to enable connection of their pivots by a bridge.

When the pivotal runners of mechanisms such as timers, dial indicators, and watch movements are mounted in place, a problem arises in holding and connecting the runners when one of the pivots of said runners is maintained in position in a plate and the opposite pivots are connected with a bridge carrying corresponding bearings. At such time, a difficulty is encountered in simultaneously bringing several pivots into accurate coincidence with the holes of their respective bearings.

It is an object of the invention to provide a device which solves this problem and thereby makes it possible to install pivotal runners in position between their two bearings, both easily and quickly.

For this purpose, said device comprises a flat member having notches which are disposed so as to receive shafts or pinions of the runners to be put in position and to serve as a positioning template therefor, said member having grooves which are adapted for being placed into communication with a source of vacuum to produce a suction effect on the runners to hold the same in position during installation in their bearings.

The flat member has shaped surfaces corresponding to the shape of the runners to be in abutment therewith in surface-to-surface contact when the shafts or pinions of the runners are engaged in the notches. The shaped surfaces of the flat member are subjected to the suction so as to hold the runners in contact therewith.

In more general terms, the invention is directed to a device which is adapted to hold an assemblage unit in position while the elements thereof are being assembled. The device comprises means adapted for being moved to a prescribed position in abutment with the elements to be assembled, and means adapted for establishing a suction pressure within the first said means for holding the elements to be assembled in abutment with the first said means to enable assembly of said elements.

It is worthy of note that the said first means serves to accurately position the elements while holding the same in such position until they have been assembled.

Further features and objects of the invention will be described in conjunction with the accompanying drawing which shows an embodiment of the invention given by way of example.

In the drawing:
FIGURE 1 is an overall plan view of the device according to the invention;
FIGURE 2 is a side view thereof, partly in section;
FIGURE 3 is a plan view, on a larger scale, of a portion of the device of FIG. 1;
FIGURE 4 is a view from below of a part of the device in FIG. 3;
FIGURE 5 is a sectional view taken along line V—V of FIGS. 3 and 4;
FIGURE 6 is a plan view on a larger scale of another portion of the device of FIG. 1;
FIGURE 7 is a sectional view taken along line VII—VII of FIG. 6;
FIGURE 8 is a plan view showing an operative position for a part of the device in FIG. 1; and
FIGURE 9 is a sectional view taken along line IX—IX of FIG. 8.

Referring now to FIGS. 1 and 2, it will be seen that the device according to the invention is particularly composed of the portion D shown on the right of said figures. Portion D is carried by an arm 1 which is fixed to a support 2 preferably by means of a hinge (not shown) so that arm 1 can be raised from the position shown in FIG. 2 and lowered to such position.

The arm 1 is provided with slots 3, and a lower plate 4 is supported for sliding movement beneath the arm 1 in guided manner by means of the slots 3 in a fashion which will be explained more fully hereinafter. Plate 4 supports at its free end on the right (in the position shown in the drawing), an intermediate plate 5 and an upper plate 6. The portion D which is composed of the arrangement of plates 4, 5, 6 at the right end in FIG. 1 forms a unit which is profiled so as to give the appearance, in horizontal projection, of a hand. The portion D will therefore be referred to as a "hand-shaped unit" or simply as a "hand unit" hereinafter. In such hand unit there are five notches 7, 8, 9, 10 and 11 of varying depth.

FIGS. 3 to 7 show details of the essential elements of the hand unit D.

FIG. 3 shows a top view of the intermediate plate 5 on a larger scale. The intermediate plate 5 is provided with a hole 12 connected to a milled countersunk cavity in its upper face extending flaringly from said hole 12 to a portion 13 defined by an arc of a circle having its center at the center of the substantially semicircular bottom of the notch 7.

The depth of the above-mentioned countersunk cavity is seen in the sectional view of FIG. 5. It corresponds to substantially one-third of the thickness of plate 5.

FIG. 4 is a view of a portion of the lower surface of the intermediate plate 5. There is formed in the lower surface thereof a groove 14 extending from said hole 12 and ending in a terminal portion defined by a circle 15 having its center at the center of the semicircular bottom of the notch 8.

The sectional view in FIG. 5 shows that said groove 14 is formed in the lower third of the thickness of the intermediate plate 5.

Located below said intermediate plate 5 is the free end of the lower plate 4 shown in detail and on the same scale as FIGS. 3 to 5 in FIGS. 6 and 7.

The lower plate 4 comprises a circular notch 12' adapted to coincide with the hole 12, notch 12' only extending partially into the depth of plate 4 as seen in FIG. 9. The lower plate 4 also has a notch 9", whose profile coincides accurately with the notch 9.

Grooves 14′ and 16 are formed in the upper face of plate 4 extending from the notch 12′.

Groove 14′ coincides exactly with the groove 14 in the lower face of the intermediate plate 5 and terminates at the circular edge 15′ which is coincident with the circular portion 15 of the intermediate plate 5.

The groove 16 extends from the notch 12′ to the bottom of the notch 9″.

The upper plate 6 is visible in the assembly of FIGS. 1, 8 and 9. The plate 6 has no grooves, but it does have a hole 12″ adapted to coincide with the hole 12 and the notch 12′ of the two other plates 5 and 4 respectively. The plate 6 has an edge 13″ in the shape of an arc of a circle coinciding with the circular portion 13 of the groove in the upper face of the intermediate plate 5. The plate 6 has, in addition, the same width as the lower plate 4.

There is arranged on the upper plate 6 a tubular connection 17 which makes it possible to connect the holes 12, 12″ and the notch 12′ to a vacuum pump.

FIGS. 8 and 9 show how the correct position of three runners is insured by means of the device as above described.

The position of the lower pivots of said runners is determined by their introduction into their respective bearings of a mounting plate 18. The hand unit D is placed above and parallel with the mounting unit 18 (see FIG. 9). Said runners are composed of wheels and pinions 19, 19′, 20, 20′, and 21, 21′. The pinion 19′ meshes with the wheel 20, and the wheel 19 meshes with the pinion 21′.

There is next described the manner in which the hand unit D holds the above-mentioned runners in position.

When the wheel 19 is inserted in the cavity in the plate 5 constituted by portions 13 shaped in the form of an arc of a circle and its pinion 19′ is applied in the bottom of the notch 7, the suction exerted by way of the hole 12 will keep the wheel in said position.

The wheel 20, whose pinion 20′ is supported in the notch 8, is subjected to suction by way of the grooves 14, 14′ and bears against the circular portions 15, 15′.

The wheel 21 has no contact with the hand unit, but its pinion 21′, is engaged in the notches 9, 9″, and is held therein by suction by way of the groove 16 opening into said notches.

Since the three runners are thus kept immovable in a predetermined correct position, it is easy to cap them with a bridge which connects them.

The intermediate plate 5 is provided with two outer notches 10 and 11. Said notches serve to establish the correct work position of plate 5 by cooperating with two corresponding fixed stops 22 and 23 which will be secured either to the support which receives mounting plate 18 or else, to the base or frame, for example, of a mounting unit comprising means adapted to cause the mounting plates to pass in turn in front of the hand unit.

The overall operation of the device according to the invention will next be described.

When the lower plate 4 occupies its retracted position as shown in FIGS. 1 and 2, a mounting plate 18 is brought into a mounting position. Three runners are then put on said mounting plate; the plate 4 is then pushed forwardly (in the direction of the arrow 24) by acting on a button 25 (FIGS. 1 and 2), until the bottoms of the notches 10 and 11 bear against the fixed positioning stops 22 and 23.

At that moment, the suction is activated to cause the runners to be immobilized in the prescribed correct position. They are then capped with a bridge to secure the mounting thereof.

The hand unit is then retracted and it becomes possible to proceed with the mounting of the next group of three runners, and so on.

FIGS. 1 and 2 show a lever 26 which is supported for pivotal movement. The lower plate 4 in retracted position abuts against an end of said lever. This action on the lever may be employed to control various operations, such as, for example, interruption and activation of the suction and the automatic advance of a conveying member carrying the mounting plates on which are to be mounted the runners.

It is obvious that the profile of the hand unit constituted by plates 4, 5, 6 cannot be universal for all runners. A given hand unit will be adapted to a given specific mounting operation and will be replaced with another appropriate hand unit in the case of another operation.

On the other hand, such a hand unit can be custom-formed easily in each particular case since it is composed of thin profiled plates assembled by screws 27 and centered by pins 28 (see FIG. 8). Pins 29 will guide the lower plate 4 under the arm 1 to which the plate 4 will be connected for sliding movement by screwing into plate 4, for example, the button 25 and a screw 30; said button and screw being slidable in respective slots 3 in the arm 1.

From the above, it is seen that there has been disclosed means in the form of said hand unit, for engaging said runners and having a profile corresponding to that of such runners, so that the runners are in abutment therewith, when the hand unit has been moved to operative position. Said hand unit is adapted for connection with a suction source and is provided with a passageway in communication with said source for exerting suction force on said runners to hold the same in abutment with said hand unit in prescribed position, as defined by said hand unit, in order to enable the assembly of a bridge member on the runners.

Numerous modifications and variations of the invention will become apparent to those skilled in the art without departing from the scope and the spirit of the invention as defined in the attached claims.

What is claimed is:

1. A device adapted to hold in position pivotal runners to enable connection of their pivots by a bridge, said device comprising means for engaging said runners and having a profile corresponding thereto such that the runners are in abutment therewith, and means adapted for connection with a suction source and defining a passageway in the first means opening externally thereof for exerting force on said runners to hold the same in abutment with said first means, said first means comprising a plurality of superposed plates having notches in registry therein at the periphery of the plates for receiving pinions of said runners and abutment surfaces for receiving the runners, said means which defines said passageway including grooves in said plates which are in communication with the notches and the abutment surfaces.

2. A device as claimed in claim 1 wherein one of said plates is provided with at least one notch adapted to cooperate with a positioning stop to hold said plates in predetermined position.

3. A device as claimed in claim 1 comprising an arm supporting one of said plates for sliding movement in the longitudinal direction of the notches.

4. A device as claimed in claim 2 wherein said notches all extend in the same general direction, said device further comprising an arm supporting one of said plates for sliding movement in the longitudinal direction of the notches.

5. A device as claimed in claim 4 wherein said plates have retracted inoperative position and an extended operative position, said device further comprising lever means supported adjacent a first of said plates to engage the same in the retracted position for interrupting the action of the suction source.

6. A device as claimed in claim 3 wherein each of the other of the plates is supported on said one plate and is independent of said arm.

7. A device adapted to hold elements of an assemblable unit in position while the unit is being assembled, said device comprising a support, means connected to said support for sliding movement and adapted for being moved to a prescribed position in abutment with elements of said unit to be assembled, and means adapted for establishing a suction pressure within the first said means for holding said elements in abutment with said first means to enable assembly of said unit, said first means having surfaces which are shaped in correspondence with the elements to enable surface-to-surface contact therewith, said first means further having notches for the accommodation therein of said elements whereby said elements are both engaged in said notches and in surface-to-surface contact with said first means, said elements being subjected to suction pressure both at the notches and said surfaces in said first means.

8. A device as claimed in claim 7 comprising means positioned with respect to said elements and said first means for limiting the movement of said first means to a position in which said elements are engaged in said notches and are in surface-to-surface contact with said means.

References Cited

UNITED STATES PATENTS

| | | | |
|---|---|---|---|
| 3,234,641 | 2/1966 | Schneider et al. | 269—21 X |
| 3,248,783 | 5/1966 | Tuetey | 29—178 |
| 3,299,502 | 1/1967 | Wanesky | 29—203 X |
| 3,321,961 | 5/1967 | Le Boeuf et al. | 269—21 X |

THOMAS H. EAGER, *Primary Examiner.*

U.S. Cl. X.R.

29—178; 269—21